(12) United States Patent
Kon

(10) Patent No.: US 10,739,537 B2
(45) Date of Patent: Aug. 11, 2020

(54) OPTICAL RECEPTACLE AND OPTICAL MODULE

(71) Applicant: Enplas Corporation, Saitama (JP)

(72) Inventor: Ayano Kon, Saitama (JP)

(73) Assignee: Enplas Corporation, Saitama (JP)

(*) Notice: Subject to any disclaimer, the term of this patent is extended or adjusted under 35 U.S.C. 154(b) by 0 days.

(21) Appl. No.: 16/083,010

(22) PCT Filed: Feb. 20, 2017

(86) PCT No.: PCT/JP2017/006138
§ 371 (c)(1),
(2) Date: Sep. 7, 2018

(87) PCT Pub. No.: WO2017/154541
PCT Pub. Date: Sep. 14, 2017

(65) Prior Publication Data
US 2019/0094476 A1 Mar. 28, 2019

(30) Foreign Application Priority Data

Mar. 7, 2016 (JP) ................................. 2016-043299

(51) Int. Cl.
*G02B 6/42* (2006.01)

(52) U.S. Cl.
CPC ............ *G02B 6/4206* (2013.01); *G02B 6/42* (2013.01); *G02B 6/4214* (2013.01); *G02B 6/4246* (2013.01)

(58) Field of Classification Search
None
See application file for complete search history.

(56) References Cited

U.S. PATENT DOCUMENTS

2005/0147353 A1* 7/2005 Vancoill ............... G02B 6/4204
385/47
2005/0195865 A1 9/2005 Aronson
(Continued)

FOREIGN PATENT DOCUMENTS

JP 07-244230 A 9/1995
JP 07244230 A * 9/1995
(Continued)

OTHER PUBLICATIONS

Asai Hiroshi, Machine Translation of WO 2014/030563 A1, 2014. (Year: 2014).*
(Continued)

*Primary Examiner* — Michelle R Connelly
(74) *Attorney, Agent, or Firm* — Brundidge & Stanger, P.C.

(57) ABSTRACT

An optical receptacle having a first optical receptacle for transmission and a second optical receptacle for reception. The first optical receptacle has a first engaging section and the second optical receptacle has a second engaging section that engages with the first engaging section. The ratio between the intensity of incident light incident to the first optical receptacle and the intensity of emitted light emitted from the first optical receptacle is smaller than the ratio between the intensity of incident light incident to the second optical receptacle and the intensity of emitted light emitted from the second optical receptacle.

6 Claims, 9 Drawing Sheets

(56) References Cited

U.S. PATENT DOCUMENTS

| | | |
|---|---|---|
| 2005/0196110 A1 | 9/2005 | Aronson |
| 2008/0159700 A1 | 7/2008 | Nakamura |
| 2015/0020964 A1 | 1/2015 | Tanazawa et al. |
| 2016/0282572 A1* | 9/2016 | Shah .................... G02B 6/4206 |

FOREIGN PATENT DOCUMENTS

| | | | |
|---|---|---|---|
| JP | 2007-525722 A | 9/2007 | |
| JP | 2007-279561 A | 10/2007 | |
| JP | 2013-156440 A | 8/2013 | |
| WO | 2014/030563 A1 | 2/2014 | |
| WO | WO-2014030563 A1 * | 2/2014 | ......... H01S 5/02284 |

OTHER PUBLICATIONS

International Search Report from International Application No. PCT/JP2017/006138 dated Apr. 11, 2017.

\* cited by examiner

OPTICAL RECEPTACLE AND OPTICAL MODULE

TECHNICAL FIELD

The present invention relates to an optical receptacle, and an optical module including the optical receptacle.

BACKGROUND ART

In the related art, an optical module including a photoelectric conversion element (light-emitting element, light-receiving element or both) is used in optical communications using an optical transmission member such as an optical fiber and a light waveguide. In an optical module, an optical receptacle that is disposed between a photoelectric conversion element and an optical transmission member and is configured to optically couple the photoelectric conversion element and an end surface the optical transmission member is used. Optical modules are classified into a transmitting optical module having a transmitting capability and a receiving optical module having a receiving capability, and a transmitting and receiving optical module having both a transmitting capability and a receiving capability.

In addition, in optical modules designed for optical communications, it is necessary to attenuate the intensity of light emitted from the optical receptacle in view of safety. For this reason, an optical filter for attenuating the intensity of light emitted from the optical receptacle is used in transmitting optical modules in some situation (see, for example, PTL 1).

FIG. 1 is a sectional view illustrating a configuration of optical receptacle 1 disclosed in PTL 1. Optical receptacle 1 disclosed in PTL 1 includes optical receptacle main body 2 and optical filter 3 (e.g. a light attenuation filter). As illustrated in FIG. 1, optical receptacle main body 2 includes lens surfaces 4 arranged in a line at even intervals on the bottom surface of optical receptacle main body 2, and optical surface 5 disposed facing away from lens surface 4. Optical filter 3 is disposed on a part of optical surface 5. Optical receptacle 1 disclosed in PTL 1 is used in the state where a photoelectric conversion device including a plurality of light-emitting elements and a plurality of light-receiving elements is disposed on lens surface 4 side, and a plurality of optical transmission members are disposed on optical surface 5 side. In optical receptacle 1 disclosed in PTL 1, optical filter 3 is disposed on the light path of light emitted from light-emitting element and entering the optical transmission member, and thus the intensity of light emitted from optical receptacle 1 toward the optical transmission member can be attenuated.

CITATION LIST

Patent Literature

PTL 1
Japanese Patent Application Laid-Open No. 2013-156440

SUMMARY OF INVENTION

Technical Problem

However, there is a limit on the miniaturization and the positioning accuracy of the optical filter, and consequently the portion that functions as the receiving optical module might be also filtered by optical filter 3 as the optical receptacle is downsized in optical receptacle 1 disclosed in PTL 1, and the intensity of light emitted from an end surface of optical transmission member toward optical receptacle 1 might be also attenuated in some situation.

An object of the present invention is to provide an optical receptacle which can appropriately attenuate the intensity of light passing through a portion for transmission even when the optical receptacle includes a portion for transmission and a portion for reception. In addition, another object of the present invention is to provide an optical module including the above-mentioned optical receptacle.

Solution to Problem

An optical receptacle according to an embodiment of the present invention is configured to be disposed between a photoelectric conversion device including a light-emitting element and a light-receiving element which are disposed on a substrate, and a plurality of optical transmission members, the optical receptacle being configured to optically couple the light-emitting element and the light-receiving element to respective end surfaces of the plurality of optical transmission members, the optical receptacle including: a first optical receptacle for transmission disposed on the substrate in such a manner that the first optical receptacle is opposite to the light-emitting element, the first optical receptacle including a first fitting part disposed in a first side surface that is not a surface opposite to the substrate; and a second optical receptacle for reception disposed on the substrate in such a manner that the second optical receptacle is opposite to the light-receiving element, the second optical receptacle including a second fitting part disposed in a second side surface that is not a surface opposite to the substrate, the second fitting part being configured to be fitted with the first fitting part. A ratio of an intensity of emission light emitted from the first optical receptacle to an intensity of incident light incident on the first optical receptacle is smaller than a ratio of an intensity of emission light emitted from the second optical receptacle to an intensity of incident light incident on the second optical receptacle.

An optical module according to an embodiment of the present invention includes: a photoelectric conversion device including a substrate, a light-emitting element and a light-receiving element, the light-emitting element and the light-receiving element being disposed on the substrate; and the above-mentioned optical receptacle. The first optical receptacle is disposed on the substrate in such a manner that the first optical receptacle is opposite to the light-emitting element. The second optical receptacle is disposed on the substrate in such a manner that the second optical receptacle is opposite to the light-receiving element. The first optical receptacle and the second optical receptacle are coupled with each other by fitting the first fitting part and the second fitting part to each other.

Advantageous Effects of Invention

According to the present invention, it is possible to appropriately attenuate the intensity of light passing through a portion for transmission even when the optical receptacle includes a portion for transmission and a portion for reception.

DESCRIPTION OF EMBODIMENTS

Embodiments of the present invention are elaborated below with reference to the accompanying drawings.

Embodiment 1

Configuration of Optical Module

Figure 1:
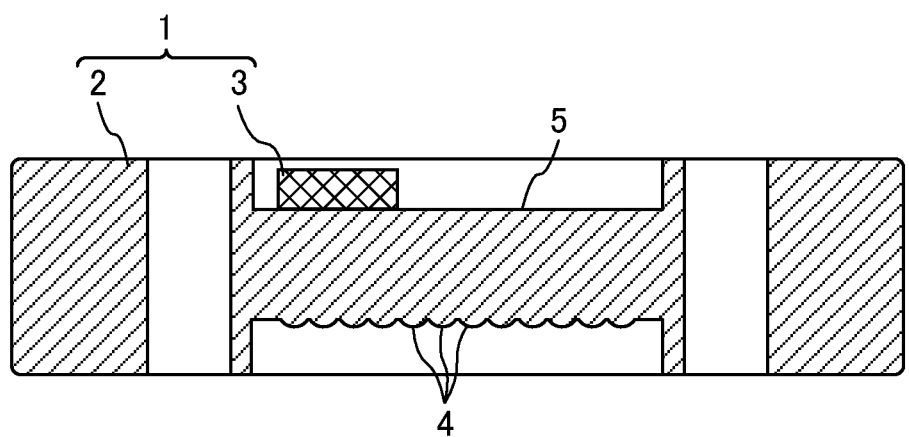
FIG. 1 is a sectional view illustrating a configuration of the optical receptacle disclosed in PTL 1.
Figure 2A:
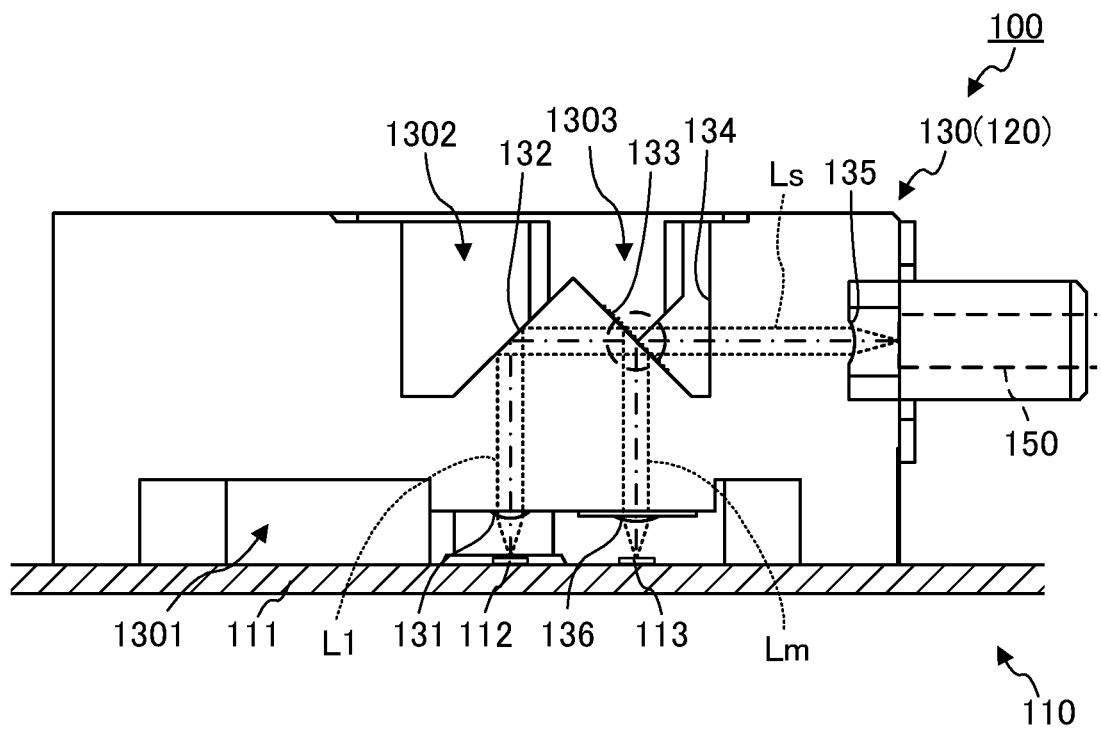
FIGS. 2A and 2B schematically illustrate a configuration of an optical module according to Embodiment 1.
Figure 2B:
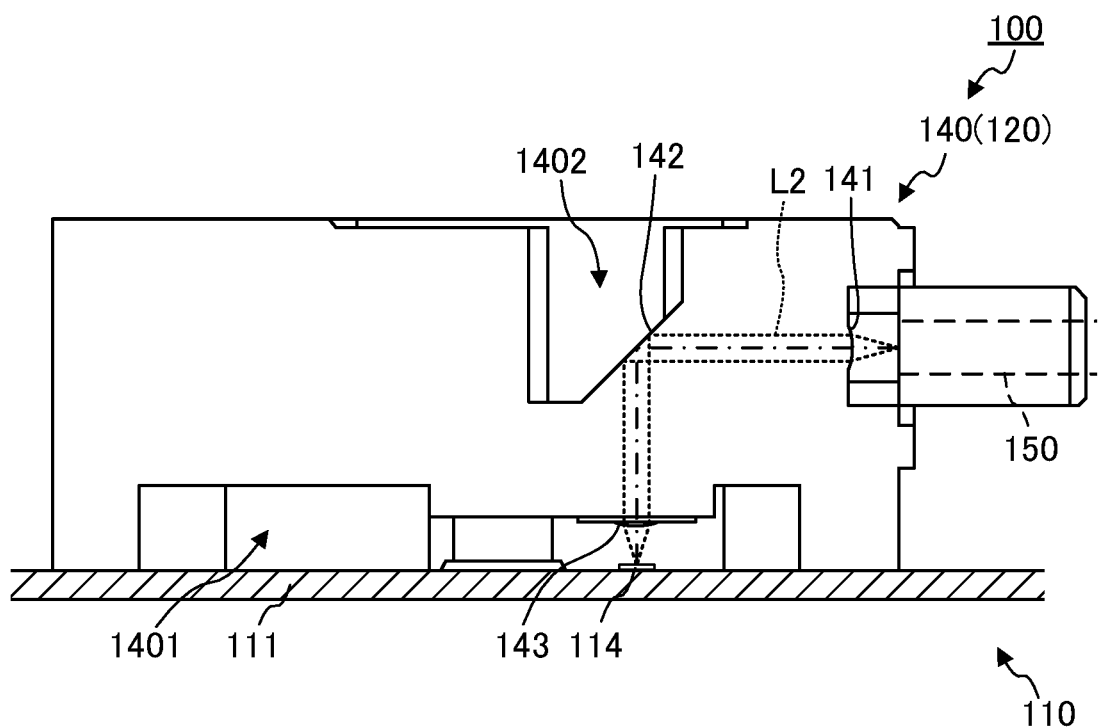

FIGS. 2A and 2B are sectional views schematically illustrating a configuration of optical module 100 according to Embodiment 1 of the present invention. FIG. 2A is a sectional view taken along line A-A of FIG. 3B described later, and FIG. 2B is a sectional view taken along line B-B of FIG. 3B described later. In FIGS. 2A and 2B, the hatching on the cross-section of optical receptacle 120 is omitted to illustrate light paths in optical receptacle 120. In addition, in FIGS. 2A and 2B, the dashed line indicates the optical axis, and the broken line indicates a light outer diameter.

As illustrated in FIG. 2A and FIG. 2B, optical module 100 includes photoelectric conversion device 110 and optical receptacle 120. Optical module 100 according to the present embodiment is a transmitting and receiving optical module. FIG. 2A illustrates a portion that functions as a transmitting optical module, and FIG. 2B illustrates a portion that functions as a receiving optical module. Optical module 100 is used with optical transmission member 150 and optical receptacle 120 connected with each other.

Photoelectric conversion device 110 includes substrate 111, light-emitting element 112, detection device 113, light-receiving element 114 and a control part (not illustrated in the drawing).

Substrate 111 holds light-emitting element 112, detection device 113, light-receiving element 114, the control part and optical receptacle 120. Substrate 111 is, for example, a glass composite substrate, a glass epoxy substrate, a flexible substrate or the like.

Light-emitting element 112 is disposed on substrate 111. Light-emitting element 112 is disposed in the portion that functions as the transmitting optical module. The number and the position of light-emitting element 112 are not limited, and may be appropriately set in accordance with the use. In the present embodiment, four light-emitting elements are arranged on one straight line along the depth direction in FIGS. 2A and 2B.

The light-emitting element emits laser light in a direction perpendicular to the front surface of substrate 111. To be more specific, the light-emitting element emits laser light from a light-emitting surface (light emission region). The number and the position of the light-emitting element are not limited. The light-emitting element is, for example, a vertical cavity surface emitting laser (VCSEL).

Detection device 113, which is disposed on substrate 111, monitors first emission light L1 emitted from the light-emitting surface (light emission region) of light-emitting element 112. To be more specific, detection device 113 receives monitor light Lm, which is a part of the first emission light emitted from optical receptacle 120. Detection device 113 is a photodiode (PD), for example.

The number of detection device 113 is not limited, and may be appropriately set in accordance with the use. In the present embodiment, four detection devices 113 are provided as with the light-emitting elements. Four detection devices 113 are disposed on substrate 111 at a position where monitor light Lm can be received. In addition, in view of preventing reflection light from detection element 113 from returning to optical receptacle 120 (first optical receptacle 130 described later), the optical axis of monitor light Lm incident on detection element 113 may be tilted with respect to the detection surface of detection element 113.

Light-receiving element 114 is disposed on substrate 111. Light-receiving element 114 is disposed in the portion that functions as the receiving optical module. The number and the position of light-receiving element 114 are not limited, and may be appropriately set in accordance with the use. In the present embodiment, four light-receiving elements 114 are arranged on one straight line along the depth direction in FIGS. 2A and 2B.

Light-receiving element 114 receives light (second emission light L2 described later) that has been emitted from the end surface of optical transmission member 150 and has passed inside optical receptacle 120 (second optical receptacle 140 described later). To be more specific, light-receiving element 114 receives second emission light L2 at light reception surface (light reception region). Light-receiving element 114 is a photodiode (PD), for example.

Although not illustrated in the drawings, the control part is disposed on substrate 111, and is electrically connected with light-emitting element 112 and detection device 113 through a wiring. On the basis of the intensity and/or the quantity of monitor light Lm received by detection device 113 and the like, the control part controls the output of first emission light L1 that is emitted by light-emitting element 112.

In the state where optical receptacle 120 is disposed between light-emitting element 112 and light-receiving element 114, and a plurality of optical transmission members 150, optical receptacle 120 optically couples light-emitting element 112 and light-receiving element 114 to respective end surfaces of optical transmission members 150. In the portion that functions as the transmitting optical module, optical receptacle 120 (first optical receptacle 130) emits, toward the end surface of optical transmission member 150, signal light Ls that is a part of first emission light L1 emitted from light-emitting element 112. In the portion that functions as the receiving optical module, optical receptacle 120 (second optical receptacle 140) emits, toward light-receiving element 114, second emission light L2 emitted from the end surface of optical transmission member 150.

Optical receptacle 120 is elaborated later, and light is denoted herein as follows. It is to be noted that FIG. 2A illustrates light (L1, Ls and Lm) passing through the portion that functions as the transmitting optical module, and FIG. 2B illustrates light (L2) passing through the portion that functions as the receiving optical module.

Here, in optical module 100 according to the present embodiment, light emitted from light-emitting element 112 is referred to as "first emission light L1." First emission light L1 is light in a range from a light-emitting surface of light-emitting element 112 to light separation part 133 described later. In addition, a part of first emission light L1 that is separated by light separation part 133 and emitted from optical receptacle 120 (first optical receptacle 130) toward the end surface of optical transmission member 150 is referred to as "signal light Ls." Signal light Ls is light in a region from light separation part 133 to the end surface of optical transmission member 150. In addition, another part of first emission light L1 that is separated from light separation part 133 and emitted from optical receptacle 120 (first optical receptacle 130) toward detection device 113 is referred to as "monitor light Lm." That is, monitor light Lm is light in a region from light separation part 133 to detection device 113. Further, light emitted from the end surface of optical transmission member 150 is referred to as "second emission light L2." Second emission light L2 is light in a region from the end surface of optical transmission member 150 to a light reception surface of light-receiving element 114. Second emission light L2 is also reception light emitted from another optical module.

Photoelectric conversion device 110 and optical receptacle 120 (first optical receptacle 130 and second optical receptacle 140) are fixed to each other with a publicly known fixing member such as an adhesive agent (e.g. heat/ultraviolet curing resin).

Optical transmission member 150 is fixed on optical receptacle 120 with a publicly known attaching means in the state where optical transmission member 150 is housed in a multicore collective connector. The type of optical transmission member 150 is not limited. Examples of the type of optical transmission member 150 include an optical fiber, a light waveguide, and the like. In the present embodiment, optical transmission member 150 is an optical fiber. In addition, the optical fiber may be of a single mode type, or a multiple mode type. The number of optical transmission member 150 is not limited, and may be appropriately changed in accordance with the use. In the present embodiment, eight optical transmission members 150 are provided. Of the eight optical transmission members 150, four optical transmission members 150 are disposed in the portion that functions as the transmitting optical module, and the other four optical transmission members 150 are disposed in the portion that functions as the receiving optical module in optical module 100.

Configuration of Optical Receptacle

Figure 3A:
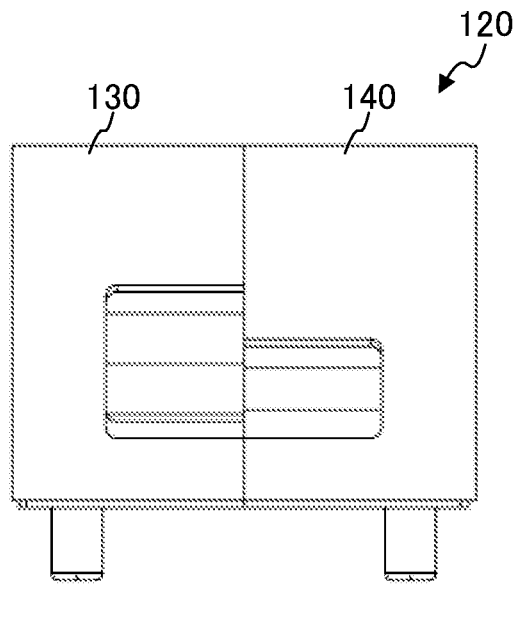
FIGS. 3A to 3F illustrate a configuration of an optical receptacle according to Embodiment 1.
Figure 3B:
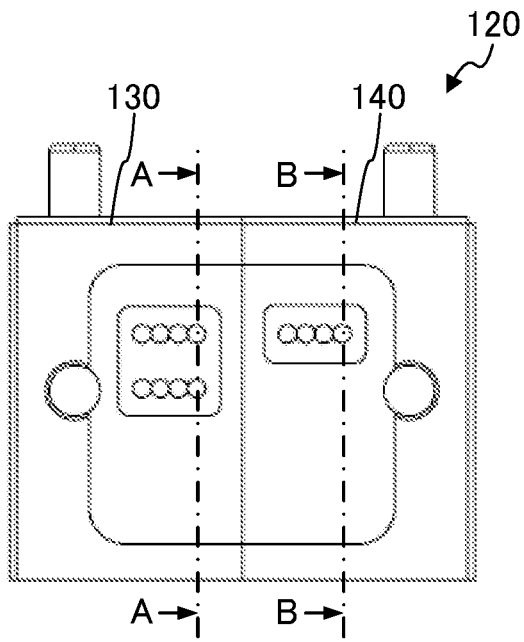
Figure 3C:
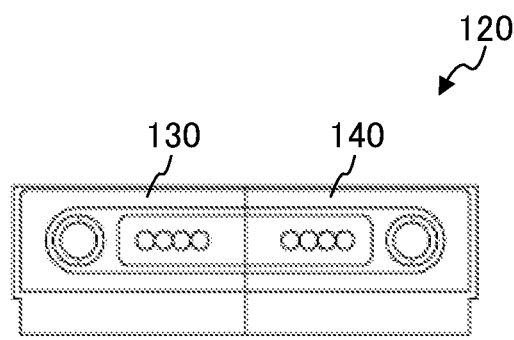
Figure 3D:
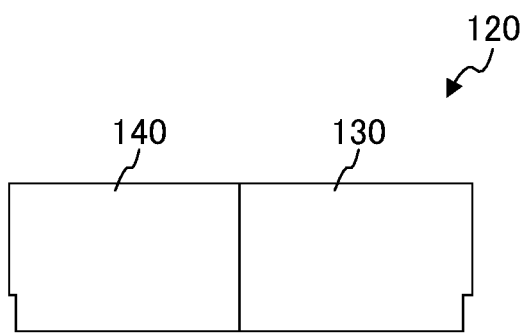
Figure 3E:
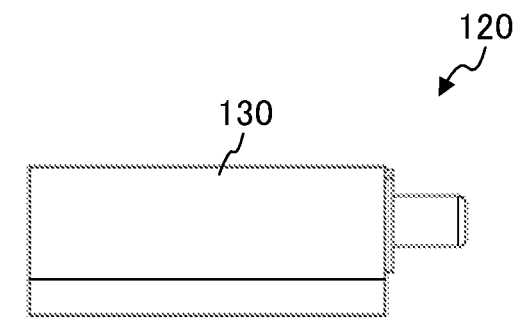
Figure 3F:
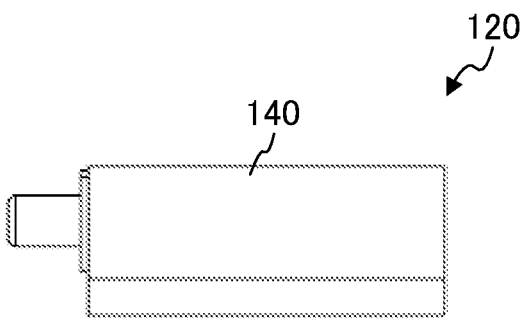

FIGS. 3A to 3F illustrate a configuration of optical receptacle 120 according to the present embodiment. FIG. 3A is a plan view of optical receptacle 120, FIG. 3B is a bottom view of optical receptacle 120, FIG. 3C is a front view of optical receptacle 120, FIG. 3D is a rear view of optical receptacle 120, FIG. 3E is a left side view of optical receptacle 120, and FIG. 3F is a right side view of optical receptacle 120. It is to be noted that, in the following description, the surface of optical receptacle 120 on which optical transmission member 150 is connected is referred to as "front surface."

As illustrated in FIGS. 3A to 3D, optical receptacle 120 includes first optical receptacle 130 for transmission, and second optical receptacle 140 for reception. First optical receptacle 130 and second optical receptacle 140 are coupled with each other by fitting first fitting part 137 and second fitting part 144, which are described later, to each other.

As illustrated in FIG. 2A, first optical receptacle 130 is disposed on substrate 111 so as to be opposite to light-emitting element 112 and detection device 113. First optical receptacle 130 allows, to enter first optical receptacle 130, first emission light L1 emitted from light-emitting element 112, and emits signal light Ls and monitor light Lm out of first optical receptacle 130.

In addition, as illustrated in FIG. 2B, second optical receptacle 140 is disposed on substrate 111 so as to be opposite to light-receiving element 114. Second optical receptacle 140 allows, to enter second optical receptacle 140, second emission light L2 emitted from the end surface of optical transmission member 150, and emits second emission light L2 out of second optical receptacle 140.

A first transmittance, which is a ratio of the intensity of emission light emitted from first optical receptacle 130 (in the present embodiment, the sum of the intensity of signal light Ls and the intensity of monitor light Lm) to the intensity of light incident on first optical receptacle 130 (in the present embodiment, first emission light L1), is smaller than a second transmittance, which is a ratio of the intensity of emission light (in the present embodiment, second emission light L2) emitted from second optical receptacle 140 to the intensity light incident on second optical receptacle 140 (in the present embodiment, second emission light L2). That is, first optical receptacle 130 for transmission causes greater light attenuation than second optical receptacle 140 for reception. The way of setting the first transmittance smaller than the second transmittance is not limited. In the present embodiment, to set the first transmittance smaller than the second transmittance, first optical receptacle 130 is composed of a material containing light attenuator for attenuating the intensity of light passing through the inside of first optical receptacle 130 (first emission light L1, signal light Ls and monitor light Lm). The first transmittance is 40 to 50, and the second transmittance is 80 to 90, for example.

First optical receptacle 130 and second optical receptacle 140 are formed with a material having a transparency to light of the wavelength used in optical communications. Examples of such a material include transparent resins such as polyetherimide (PEI) and cyclic olefin resin. In the case where first optical receptacle 130 and second optical receptacle 140 are composed of a resin composition as described above, it is preferable that the base resins of first optical receptacle 130 and second optical receptacle 140 be identical to each other. With such a configuration, the linear expansion coefficients of first optical receptacle 130 and second optical receptacle 140 are set to an identical value, and reduction in shape precision can be suppressed even in the case where optical module 100 is used under a high temperature.

As described above, a light attenuator for attenuating the intensity of light (first emission light L1, monitor light Lm and signal light Ls) passing through the inside of optical receptacle 130 is added in the material of first optical receptacle 130 according to the present embodiment. Examples of the light attenuator include inorganic particles (such as carbon black and oxidation copper) and organic coloring matter (phthalocyanine coloring matter). The amount of the light attenuator in the material of first optical receptacle 130 is appropriately selected in accordance with the type of the light attenuator, the length of the light path in first optical receptacle 130, the type of light-emitting element 112 and the like. While the material of second optical receptacle 140 does not contain the above-mentioned light attenuator in the present embodiment, the material of second optical receptacle 140 may contain the above-mentioned light attenuator as long as the amount thereof is smaller than that of the material of first optical receptacle 130.

In addition, preferably, an anti-reflection film is disposed on the surface of second optical receptacle 140 for reception in view of reducing light reflection at the surface. The anti-reflection film may be disposed on the entire surface of second optical receptacle 140, or may be disposed only in an optical surface (in the present embodiment, fourth optical surface 141) where second emission light L2 emitted from the end surface of optical transmission member 150 impinges. The way of disposing the anti-reflection film on the surface of second optical receptacle 140 may be, but not limited to, applying an anti-reflection coating (AR coating) on the surface of second optical receptacle 140, for example. Examples of the material of the anti-reflection film include $SiO_2$, $TiO_2$ and $MgF_2$.

In the case where first optical receptacle 130 and second optical receptacle 140 are so small that it is difficult to assemble optical module 100, it is preferable to dispose optical receptacle 120 on substrate 111 after first optical receptacle 130 and second optical receptacle 140 are coupled with each other, in view of increasing the ease of assembly of optical module 100.

Configuration of First Optical Receptacle

Figure 4A:
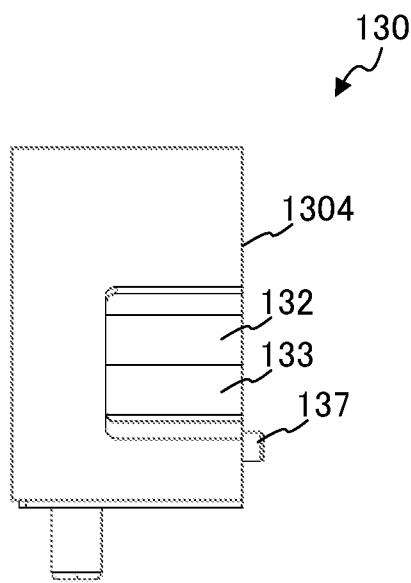
FIGS. 4A to 4F illustrate a configuration of a first optical receptacle according to Embodiment 1.
Figure 4B:
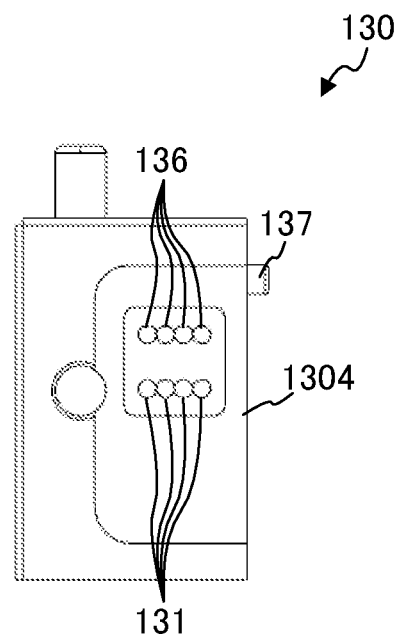
Figure 4C:
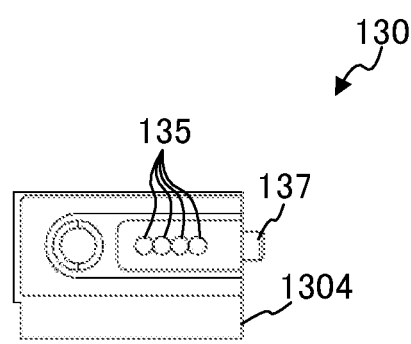
Figure 4D:
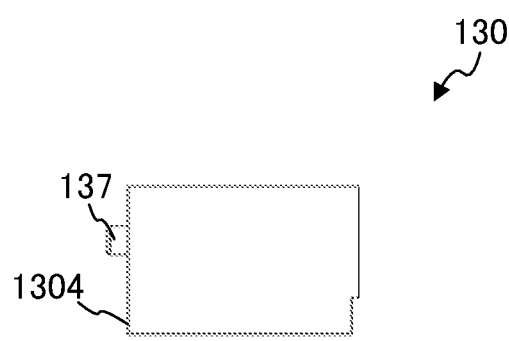
Figure 4E:
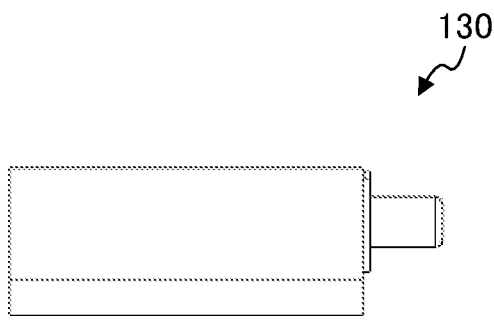
Figure 4F:
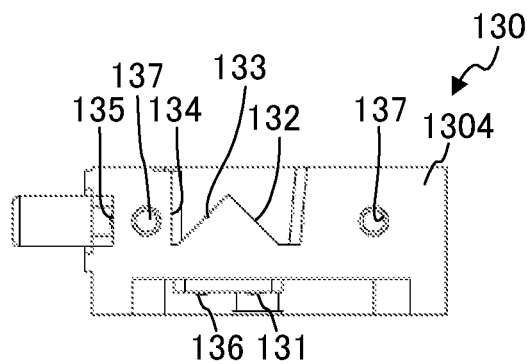

FIGS. 4A to 4F illustrate a configuration of first optical receptacle 130 according to the present embodiment. FIG. 4A is a plan view of first optical receptacle 130, FIG. 4B is a bottom view of first optical receptacle 130, FIG. 4C is a front view of first optical receptacle 130, FIG. 4D is a rear view of first optical receptacle 130, FIG. 4E is a left side view of first optical receptacle 130, and FIG. 4F is a right side view of first optical receptacle 130.

As illustrated in FIG. 2A and FIGS. 4A to 4F, first optical receptacle 130 is a member having a substantially cuboid shape. In the present embodiment, first recess 1301 having a substantially rectangular prism shape and opening outward in the bottom surface is formed in the bottom surface of first optical receptacle 130. In the top surface (facing away from the surface (bottom surface) facing substrate 111) of first optical receptacle 130, second recess 1302 (referred to as "first recess" in the claims) having a substantially pentagonal prism shape, and third recess 1303 (referred to as "second recess" in the claims) having a substantially pentagonal prism shape are continuously formed in a direction from the back side to the front side of optical receptacle 120 so as to open outward in the top surface and the right side surface. As elaborated later, a part of the inner surface of second recess 1302 is first reflection surface 132, and a part of the inner surface of third recess 1303 is divided reflection surface 133a (see FIG. 5A described later). It is to be noted that, in the present embodiment, second recess 1302 and third recess 1303 communicate with each other.

First optical receptacle 130 includes first optical surface 131, first reflection surface 132, light separation part 133, transmission surface 134, second optical surface 135, third optical surface 136 and first fitting part 137.

First optical surface 131 allows, to enter first optical receptacle 130, first emission light L1 emitted from light-emitting element 112. At this time, first optical surface 131 allows, to enter first optical receptacle 130, first emission light L1 emitted from the light-emitting surface (light emission region) of light-emitting element 112 while refracting the light so as to convert the light into collimate light.

The number of first optical surface 131 is not limited, and may be appropriately selected in accordance with the use. In the present embodiment, four first optical surfaces 131 are provided. Four first optical surfaces 131 are respectively disposed so as to be opposite to four light-emitting elements 112 in the bottom surface of first optical receptacle 130.

The shape of first optical surface 131 may be, but not limited to, a plane shape or a curved shape. In the present embodiment, first optical surface 131 is a convex lens surface protruding toward light-emitting element 112. In addition, the shape of first optical surface 131 in plan view is a circular shape. Preferably, the central axis of first optical surface 131 is perpendicular to the light-emitting surface of light-emitting element 112 (and the front surface of substrate 111). In addition, preferably, the central axis of first optical surface 131 matches the optical axis of first emission light L1 emitted from light-emitting element 112.

First reflection surface 132 reflects, toward second optical surface 135 side, first emission light L1 having entered first optical receptacle 130 from first optical surface 131. First reflection surface 132 is a part of the inner surface of second recess 1302. First reflection surface 132 is tilted such that the distance thereof to second optical surface 135 (the front surface of first optical receptacle 130) decreases from the bottom surface toward the top surface of first optical receptacle 130. The inclination angle of first reflection surface 132 is not limited. In the present embodiment, the inclination angle of first reflection surface 132 is 45° with respect to the optical axis of light incident on first reflection surface 132 (first emission light L1). The shape of first reflection surface 132 may be, but not limited to, a plane shape, or a curved shape. In the present embodiment, first reflection surface 132 has a plane shape. The incident angle of light (first emission light L1) incident on first reflection surface 132 is greater than the critical angle.

Light separation part 133 separates first emission light L1, which has entered first optical receptacle 130 from first optical surface 131 and has been reflected by first reflection surface 132, into monitor light Lm travelling toward detection device 113 and signal light Ls travelling toward the end surface of optical transmission member 150. Light separation part 133 is disposed on the light path between first optical surface 131 and second optical surface 135. Light separation part 133 is a part of the inner surface of third recess 1303.

Figure 5A:
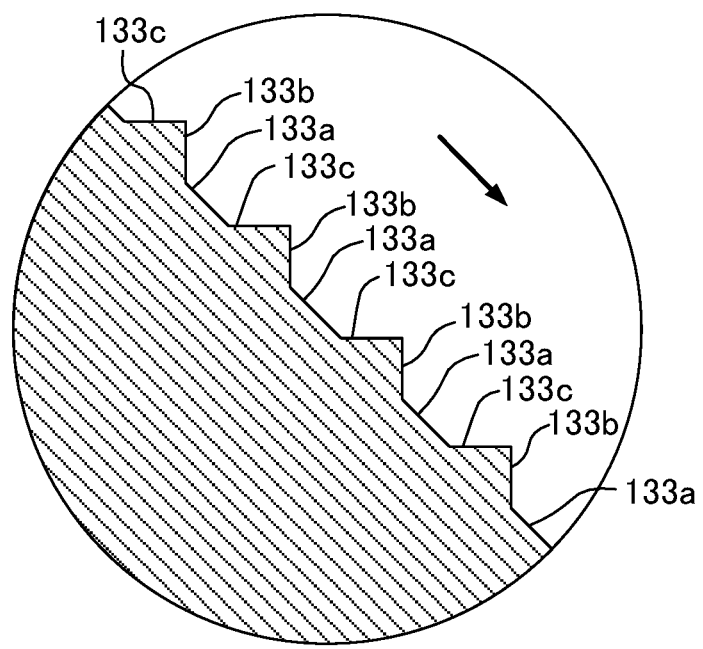
FIGS. 5A and 5B illustrate a configuration of a light separation part of the first optical receptacle according to Embodiment 1.
Figure 5B:
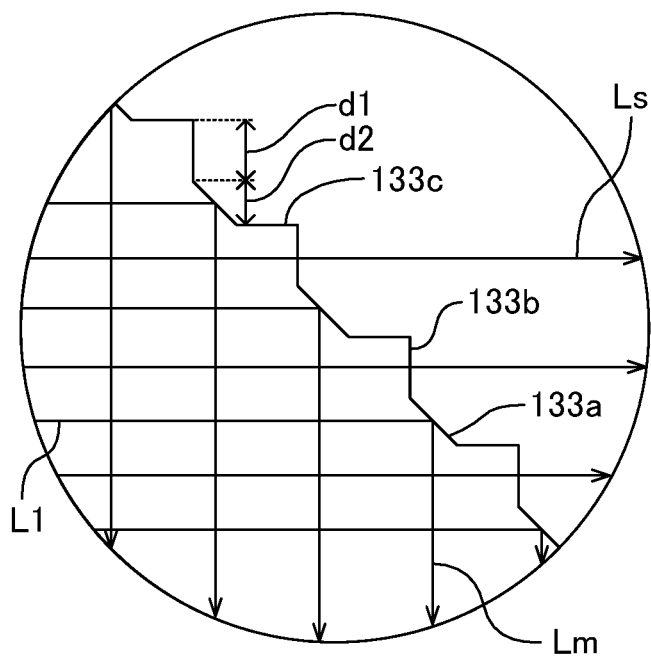

FIGS. 5A and 5B illustrate a configuration of light separation part 133 of first optical receptacle 130 according to the present embodiment. FIG. 5A is a partially enlarged sectional view of the region indicated with the broken line in FIG. 5A, and FIG. 5B is a partially enlarged sectional view illustrating light paths in first optical receptacle 130 in a region around light separation part 133. In FIG. 5B, the hatching on the cross-section of first optical receptacle 130 is omitted to illustrate light paths in first optical receptacle 130.

Light separation part 133 includes a plurality of divided reflection surfaces 133a, a plurality of divided transmission surfaces 133b, and a plurality of divided step surfaces 133c. Divided reflection surfaces 133a alternate with divided transmission surfaces 133b along the inclination direction of divided reflection surface 133a (see the arrow illustrated in FIG. 5A).

Divided reflection surface 133a internally reflects, toward third optical surface 136, a part of first emission light L1 as monitor light Lm. Divided reflection surface 133a is also a surface inclined to the optical axis of first emission light L1. In the present embodiment, divided reflection surface 133a is tilted such that the distance thereof to second optical surface 135 (the front surface of first optical receptacle 130) decreases from the top surface to the bottom surface of first optical receptacle 130. The inclination angle of divided reflection surface 133a is 45° with respect to the optical axis of first emission light L1. Divided reflection surfaces 133a are spaced in the inclination direction of divided reflection surfaces 133a at a predetermined interval. Divided reflection surfaces 133a are disposed on the same plane.

Divided transmission surface 133b allows a part of first emission light L1 as signal light Ls to pass therethrough toward second optical surface 135 side. Divided transmission surface 133b is perpendicular to the optical axis of first emission light L1. Divided transmission surfaces 133b are spaced in the inclination direction of divided reflection surface 133a at a predetermined interval. Divided transmission surfaces 133b are parallel to each other.

Divided step surface 133c is parallel to the optical axis of first emission light L1, and connects between divided reflection surface 133a and divided transmission surface 133b. Also, divided step surfaces 133c are disposed at a predetermined interval in the inclination direction of divided reflection surface 133a. Divided step surfaces 133c are parallel to each other.

As illustrated in FIG. 5A, divided reflection surface 133a, divided step surface 133c and divided transmission surface 133b are arranged in the named order along the direction from the top surface toward the bottom surface. The smaller angle between divided reflection surface 133a and divided transmission surface 133b is 135°. Also, the smaller angle between divided reflection surface 133a and divided step surface 133c is 135°.

Next, light separation at light separation part 133 is described.

As illustrated in FIG. 5B, a part of first emission light L1 reflected by first reflection surface 132 is internally incident on divided reflection surface 133a at an incident angle greater than the critical angle. Divided reflection surface 133a internally reflects, toward third optical surface 136 (detection device 113 side), a part of first emission light L1, thereby generating monitor light Lm. In addition, a remaining part of first emission light L1 is incident on divided transmission surface 133b. Divided transmission surface 133b allows the remaining part of first emission light L1 to pass therethrough, thereby generating signal light Ls directed toward second optical surface 135 (the end surface of optical transmission member 150). At this time, since divided transmission surface 133b is perpendicular to incident first emission light L1, divided transmission surface 133b does not refract signal light Ls. It is to be noted that, since divided step surface 133c is parallel to the incident direction of first emission light L1, first emission light L1 does not incident on divided step surface 133c.

The light quantity ratio between signal light Ls and monitor light Lm is not limited as long as monitor light Lm capable of monitoring the intensity and the quantity of first emission light L1 emitted from light emitting element 112, and signal light Ls of a desired quantity can be obtained. The light quantity ratio between signal light Ls and monitor light Lm is approximately equal to the area ratio between divided transmission surface 133b and divided reflection surface 133a in light separation part 133 viewed from first reflection surface 132 side. Accordingly, the light quantity ratio between signal light Ls and monitor light Lm can be adjusted by changing the area ratio (see d1 and d2 of FIG. 5B) between divided transmission surface 133b and divided reflection surface 133a in light separation part 133 viewed from first reflection surface 132 side. Preferably, the light quantity ratio of signal light Ls to monitor light Lm is 5:5 to 9:1, more preferably, 7:3. In the present embodiment, the ratio of signal light Ls to monitor light Lm is 8:2.

Transmission surface 134 allows, to reenter first optical receptacle 130, signal light Ls which has been separated by light separation part 133 and has been emitted out of first optical receptacle 130. Transmission surface 134 is a part of the inner surface of third recess 1303.

Preferably, transmission surface 134 is perpendicular to signal light Ls separated by light separation part 133. With such a configuration, it is possible to allow signal light Ls travelling toward the end surface of optical transmission member 150 to enter first optical receptacle 130 without refracting signal light Ls. In addition, transmission surface 134 may be tilted with respect to the optical axis of signal light Ls separated by light separation part 133. In this case, transmission surface 134 is tilted such that the distance thereof to second optical surface 135 decreases from the bottom surface toward the top surface of first optical receptacle 130. Preferably, the inclination angle of transmission surface 134 as a tilted surface is, but not limited to, an inclination angle corresponding to a releasing taper for releasing in injection molding.

Second optical surface 135 emits, toward the end surface of optical transmission member 150, signal light Ls that is a part of first emission light L1 having entered first optical receptacle 130 from first optical surface 131 and having passed through the inside of first optical receptacle 130. At this time, second optical surface 135 emits signal light Ls toward the end surface of optical transmission member 150 while converging signal light Ls.

The number of second optical surface 135 is not limited, and may be appropriately selected in accordance with the use. In the present embodiment, four second optical surfaces 135 are provided. In the front surface of first optical receptacle 130, four second optical surfaces 135 are disposed so as to be opposite to the end surfaces of respective optical transmission members 150.

The shape of second optical surface 135 may be, but not limited to, a plane shape or a curved shape. In the present embodiment, the shape of second optical surface 135 is a convex lens protruding toward the end surface of optical transmission member 150. In plan view, second optical surface 135 has a circular shape. Preferably, the central axis of second optical surface 135 is perpendicular to the end surface of optical transmission member 150.

Third optical surface 136 emits, toward detection device 113, monitor light Lm separated by light separation part 133. At this time, third optical surface 136 emits monitor light Lm toward detection device 113 while converging monitor light Lm.

The number of third optical surface 136 is not limited, and may be appropriately selected in accordance with the use. In the present embodiment, four third optical surfaces 136 are provided. On the bottom surface of first optical receptacle 130, four third optical surfaces 136 are respectively opposite to four detection devices 113.

The shape of third optical surface 136 may be, but not limited to, a plane shape or a curved shape. In the present embodiment, third optical surface 136 is a convex lens protruding toward detection device 113. As described above, in view of preventing reflection light from detection device 113 from returning into first optical receptacle 130, it is preferable that the central axis of third optical surface 136 be tilted with respect to the detection surface of detection device 113.

First fitting part 137 is fitted to second fitting part 144 described later. With this configuration, first optical receptacle 130 and second optical receptacle 140 are positioned and coupled to each other. First fitting part 137 is disposed at a position opposite to second fitting part 144 (described later) in first side surface 1304 (in the present embodiment, the right side surface) that is not the surface (in the present embodiment, the bottom surface) opposite to substrate 111 in optical receptacle 130.

The arrangement, shape, size, and number of first fitting part 137 are not limited as long as first optical receptacle 130 and second optical receptacle 140 are appropriately coupled with each other, and the arrangement, shape, size, and number of first fitting part 137 correspond to those of second fitting part 144. One or more first fitting parts 137 are provided. Examples of the shape of first fitting part 137 include a recessed shape and a protruding shape. Examples of the shape of first fitting part 137 in plan view include a circular shape, an elliptical shape, a quadrangular shape and a polygonal shape. In the present embodiment, first fitting part 137 is composed of a columnar-shaped protrusion disposed on the front surface side of first side surface 1304, and a columnar-shaped recess disposed on the back side of first side surface 1304.

Configuration of Second Optical Receptacle

Figure 6A:
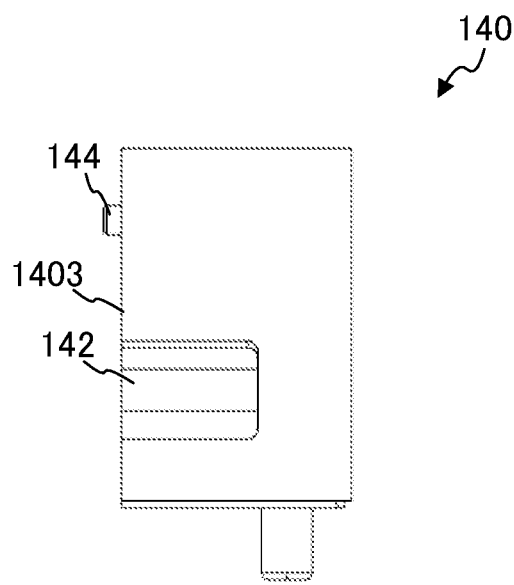
FIGS. 6A to 6F illustrate a configuration of a second optical receptacle according to Embodiment 1.
Figure 6B:
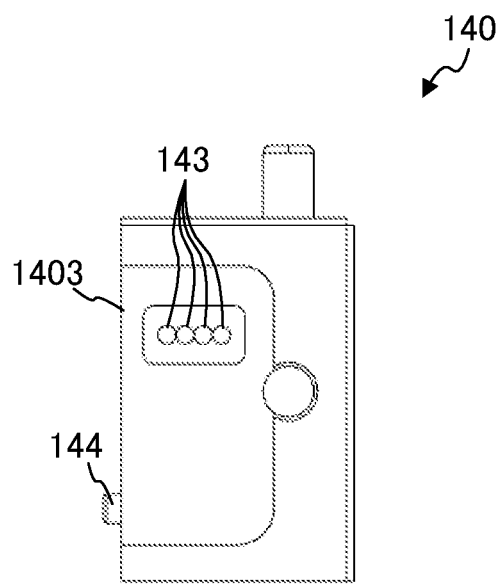
Figure 6C:
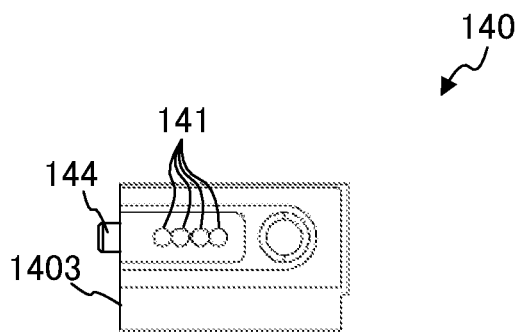
Figure 6D:
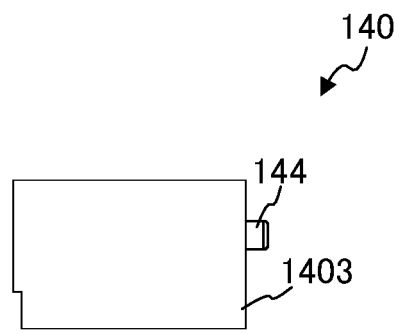
Figure 6E:
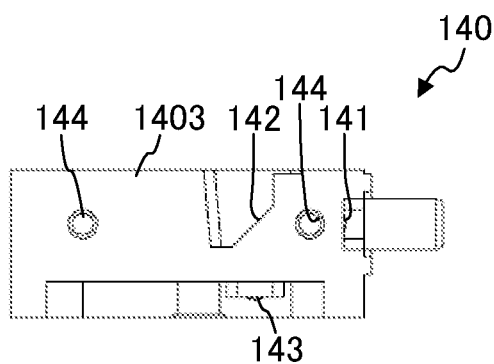
Figure 6F:
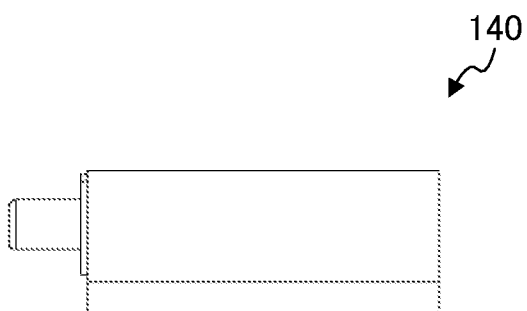

FIGS. 6A to 6F illustrate a configuration of second optical receptacle 140 according to the present embodiment. FIG. 6A is a plan view of second optical receptacle 140, FIG. 6B is a bottom view of second optical receptacle 140, FIG. 6C is a front view of second optical receptacle 140, FIG. 6D is a rear view of second optical receptacle 140, FIG. 6E is a left side view of second optical receptacle 140, and FIG. 6F is a right side view of second optical receptacle 140.

As illustrated in FIG. 2B and FIGS. 6A to 6F, second optical receptacle 140 is a member having a substantially cuboid shape. In the present embodiment, in the bottom surface of second optical receptacle 140, fourth recess 1401 having a substantially rectangular prism shape and opening outward in the bottom surface is formed. In the top surface (facing away from the surface (bottom surface) facing substrate 111) of second optical receptacle 140, fifth recess 1402 (referred to as "third recess" in the claims) having a substantially pentagonal prism shape and opening outward in the top surface and the left side surface is formed. As elaborated later, a part of the inner surface of fifth recess 1402 is second reflection surface 142.

Second optical receptacle 140 includes fourth optical surface 141 (referred to as "third optical surface" in the claims), second reflection surface 142, fifth optical surface 143 (referred to as "fourth optical surface" in the claims) and second fitting part 144.

Fourth optical surface 141 allows, to enter second optical receptacle 140, second emission light L2 emitted from the end surface of optical transmission member 150. At this time, fourth optical surface 141 allows, to enter second optical receptacle 140, second emission light L2 emitted from the end surface of optical transmission member 150 while refracting the second emission light L2, and thus converts the second emission light L2 into collimate light.

The number of fourth optical surface 141 is not limited, and may be appropriately selected in accordance with the use. In the present embodiment, four fourth optical surfaces 141 are provided. In the front surface of second optical receptacle 140, four fourth optical surfaces 141 are disposed so as to be opposite to the end surfaces of respective optical transmission members 150.

The shape of fourth optical surface 141 may be, but not limited to, a plane shape, or a curved shape. In the present embodiment, the shape of fourth optical surface 141 is a convex lens protruding toward the end surface of optical transmission member 150. Fourth optical surface 141 has a circular shape in plan view. Preferably, the central axis of fourth optical surface 141 is perpendicular to the end surface of optical transmission member 150. In addition, preferably, the central axis of fourth optical surface 141 matches the optical axis of second emission light L2 emitted from the end surface of optical transmission member 150.

Second reflection surface 142 reflects, toward fifth optical surface 143, second emission light L2 having entered second optical receptacle 140 from fourth optical surface 141. Second reflection surface 142 is a part of the inner surface of fifth recess 1402. Second reflection surface 142 is tilted such that the distance thereof to fourth optical surface 141 (the front surface of second optical receptacle 140) decreases from the bottom surface toward the top surface of second optical receptacle 140. The inclination angle of second reflection surface 142 is not limited. In the present embodiment, the inclination angle of second reflection surface 142 is 45° with respect to the optical axis of light incident on second reflection surface 142 (second emission light L2). The shape of second reflection surface 142 may be, but not limited to, a plane shape or a curved shape. In the present embodiment, second reflection surface 142 has a plane shape. The incident angle of light (second emission light L2) incident on second reflection surface 142 is greater than the critical angle.

Fifth optical surface 143 emits, toward light-receiving element 114, second emission light L2 that has entered second optical receptacle 140 from fourth optical surface 141 and has passed through the inside of second optical receptacle 140. At this time, fifth optical surface 143 emits second emission light L2 toward the light reception surface of light-receiving element 114 while converging second emission light L2.

The number of fifth optical surface 143 is not limited, and may be appropriately selected in accordance with the use. In the present embodiment, four fifth optical surfaces 143 are provided. In the bottom surface of second optical receptacle 140, four fifth optical surfaces 143 are respectively disposed so as to be opposite to four light-receiving elements 114.

The shape of fifth optical surface 143 may be, but not limited to, a plane shape or a curved shape. In the present embodiment, the shape of fifth optical surface 143 is a convex lens surface protruding toward light-receiving element 114. Fifth optical surface 143 has a circular shape in plan view. Preferably, the central axis of fifth optical surface 143 is perpendicular to light reception surface of light-receiving element 114 (and the front surface of substrate 111).

Second fitting part 144 is fitted to first fitting part 137. In this manner, first optical receptacle 130 and second optical receptacle 140 are positioned and coupled to each other. Second fitting part 144 is disposed at a position opposite to first fitting part 137 in second side surface 1403 (in the present embodiment, the left side surface) that is not the surface (in the present embodiment, the bottom surface) opposite to substrate 111 in second optical receptacle 140.

The arrangement, shape, size, and number of second fitting part 144 correspond to those of first fitting part 137, and are not limited as long as first optical receptacle 130 and second optical receptacle 140 are appropriately coupled with each other. One or more second fitting parts 144 are provided. Examples of the shape of second fitting part 144 include a recessed shape and a protruding shape. Examples of the shape of second fitting part 144 in plan view include a circular shape, an elliptical shape, a quadrangular shape and a polygonal shape. In the present embodiment, second fitting part 144 is composed of a columnar-shaped recess disposed on the front surface side of second side surface 1402, and a columnar-shaped protrusion disposed on the back side of second side surface 1402.

Light Paths in Optical Module

Next, light paths in optical module 100 are described.

In first optical receptacle 130 that functions as the transmitting optical module, first emission light L1 emitted from light-emitting element 112 enters first optical receptacle 130 from first optical surface 131. At this time, first emission light L1 is converted to collimate light by first optical surface 131. Next, first emission light L1 having entered first optical receptacle 130 from first optical surface 131 is reflected by first reflection surface 132 toward light separation part 133. A part of first emission light L1 reaching light separation part 133 is internally reflected by divided reflection surface 133a toward third optical surface 136, and becomes monitor light Lm. Monitor light Lm is emitted out of first optical receptacle 130 from third optical surface 136, and reaches the detection surface of detection device 113. On the other hand, the remaining part of first emission light L1 reaching light separation part 133 passes through divided transmission surface 133b while being emitted out of first optical receptacle 130, and becomes signal light Ls. Next, signal light Ls reenters first optical receptacle 130 from transmission surface 134, and reaches second optical surface 135. Signal light Ls reaching second optical surface 135 is emitted out of first optical receptacle 130 from second optical surface 135, and reaches the end surface of optical transmission member 150. Since the material of first optical receptacle 130 contains a light attenuator, the intensities of first emission light L1, signal light Ls and monitor light Lm are attenuated as first emission light L1, signal light Ls and monitor light Lm pass through first optical receptacle 130.

On the other hand, in second optical receptacle 140 that functions as the receiving optical module, second emission light L2 emitted from the end surface of optical transmission member 150 enters second optical receptacle 140 from fourth optical surface 141. At this time, second emission light L2 is converted to collimate light by fourth optical surface 141. Next, second emission light L2 having entered second optical receptacle 140 from fourth optical surface 141 is reflected by second reflection surface 142 toward fifth optical surface 143. Next, second emission light L2 reaching fifth optical surface 143 is emitted out of second optical receptacle 140 from fifth optical surface 143, and reaches light-receiving element 114. Since the material of second optical receptacle 140 does not contain a light attenuator, almost no attenuation of the intensity of second emission light L2 is caused as second emission light L2 passes through the inside of second optical receptacle 140.

In the above-mentioned manner, optical receptacle 120 according to the present embodiment can appropriately optically couple light-emitting element 112 and light-receiving element 114 to the end surfaces of respective optical transmission members 150 while attenuating the intensity of light passing through the portion that functions as the transmitting optical module.

Effect

As described above, optical receptacle 120 according to the present embodiment includes first optical receptacle 130 for transmission and second optical receptacle 140 for reception that are coupled with each other through a fitting structure (first fitting part 137 and second fitting part 144). First optical receptacle 130 and second optical receptacle 140 may be manufactured as separated members. First optical receptacle 130 is composed of a material containing a light attenuator, and second optical receptacle 140 is composed of a material that does not contain a light attenuator. With this configuration, it is possible to appropriately attenuate only the intensity of light passing through the portion that functions as the transmitting optical module without substantially attenuating the intensity of light passing through the portion that functions as the receiving optical module.

In addition, by using unified fitting structures (first fitting part 137 and second fitting part 144), it is possible to readily change the combination of first optical receptacle 130 and second optical receptacle 140 that are different in optical design.

Embodiment 2

Optical module 200 according to Embodiment 2 is different from optical module 100 according to Embodiment 1 only in configuration of optical receptacle 220 first optical receptacle 230. To be more specific, first optical receptacle 230 according to Embodiment 2 is different from first optical receptacle 130 according to Embodiment 1 only in that first optical receptacle 230 according to Embodiment 2 includes light attenuation film 238. In view of this, the components same as those of Embodiment 1 are denoted with the same reference numerals and the description thereof will be omitted.

Configuration of Optical Module

Figure 7A:
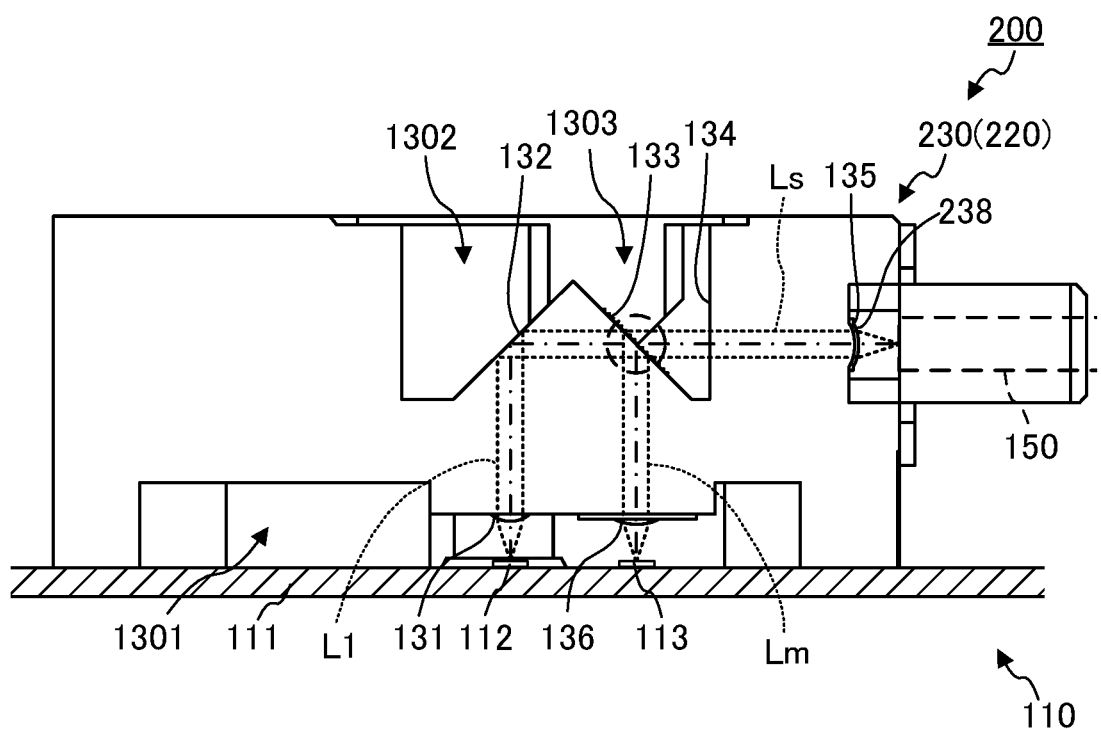
FIGS. 7A and 7B schematically illustrate a configuration of an optical module according to Embodiment 2.
Figure 7B:
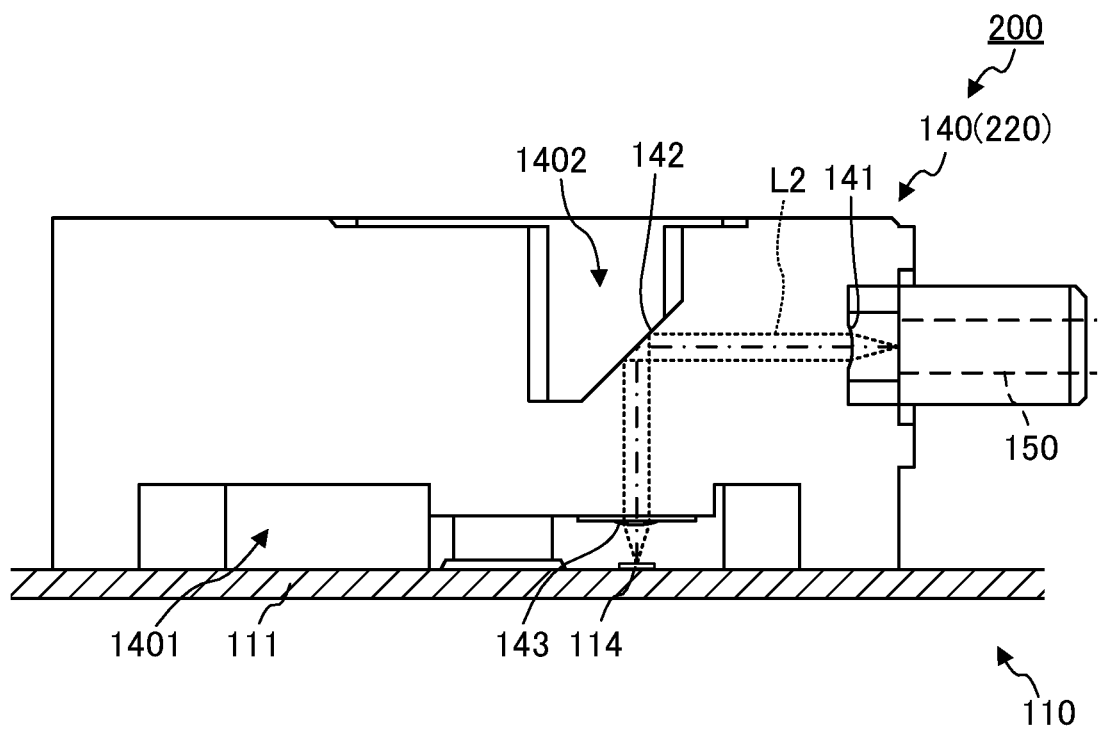

FIGS. 7A and 7B schematically illustrate a configuration of optical module 200 according to Embodiment 2 of the present invention. FIG. 7A is a sectional view taken along line A-A of FIG. 8B described later, and FIG. 7B is a sectional view taken along line B-B of FIG. 8B described later. In FIGS. 7A and 7B, the hatching on the cross-section of optical receptacle 220 is omitted to illustrate light paths in optical receptacle 220. In addition, in FIGS. 7A and 7B, the dashed line indicates the optical axis, and the broken line indicates a light outer diameter.

As illustrated in FIG. 7A and FIG. 7B, optical module 200 includes photoelectric conversion device 110 and optical receptacle 220. Optical module 200 according to the present embodiment is a transmitting and receiving optical module. FIG. 7A illustrates a portion that functions as the transmitting optical module, and FIG. 7B illustrates a portion that functions as the receiving optical module. Optical module 200 is used with optical receptacle 220 and optical transmission member 150 connected with each other.

Configuration of Optical Receptacle

Figure 8A:
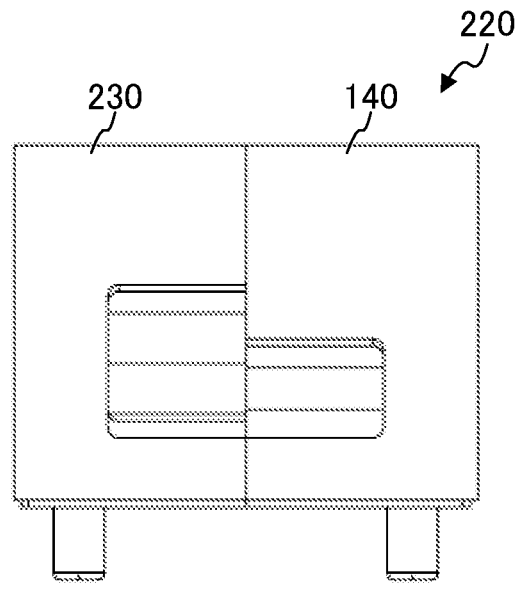
FIGS. 8A to 8F illustrate a configuration of an optical receptacle according to Embodiment 2.
Figure 8B:
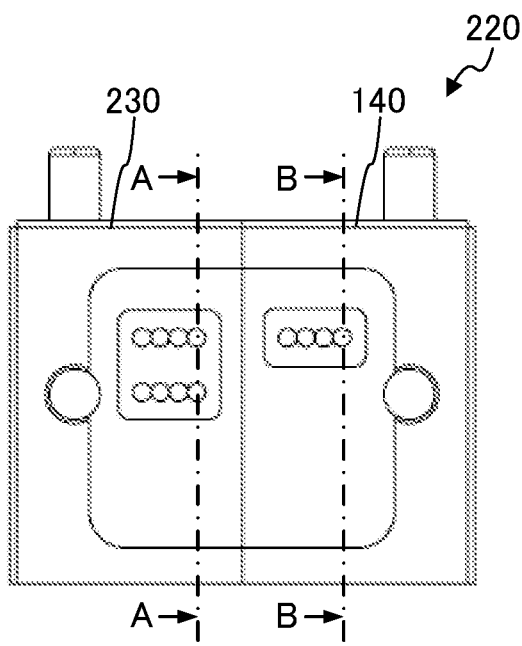
Figure 8C:
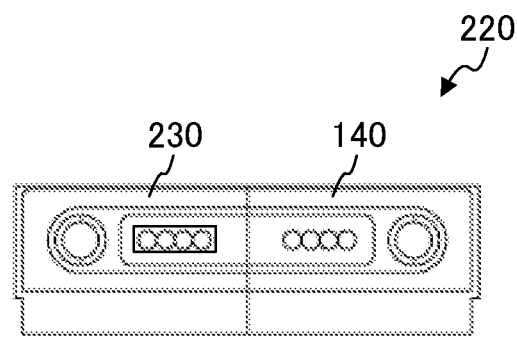
Figure 8D:
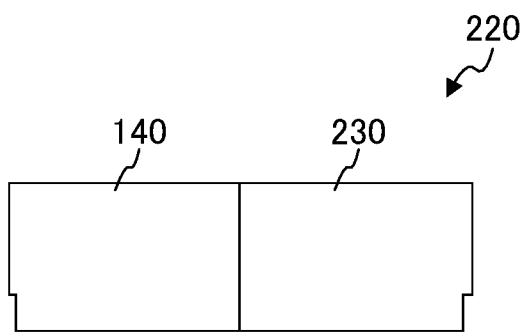
Figure 8E:
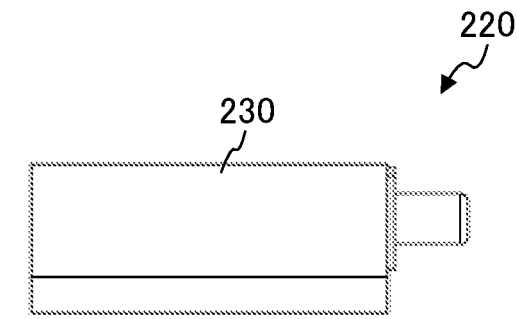
Figure 8F:
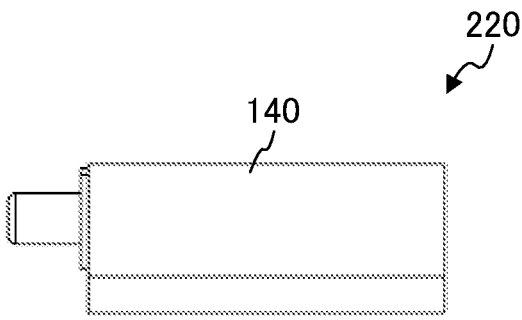

FIGS. 8A to 8F illustrate a configuration of optical receptacle 220 according to the present embodiment. FIG. 8A is a plan view of optical receptacle 220, FIG. 8B is a bottom view of optical receptacle 220, FIG. 8C is a front view of optical receptacle 220, FIG. 8D is a rear view of optical receptacle 220, FIG. 8E is a left side view of optical receptacle 220, and FIG. 8F is a right side view of optical receptacle 220. It is to be noted that, in the following description, the surface of optical receptacle 220 on which optical transmission member 150 is connected is referred to as "front surface."

As illustrated in FIGS. 8A to 8D, optical receptacle 220 includes first optical receptacle 230 for transmission, and second optical receptacle 140 for reception. First optical receptacle 230 and second optical receptacle 140 are coupled with each other by fitting first fitting part 137 and second fitting part 144 to each other.

As illustrated in FIG. 7A, first optical receptacle 230 is disposed on substrate 111 so as to be opposite to light-emitting element 112 and detection device 113. First optical receptacle 230 allows, to enter first optical receptacle 230, first emission light L1 emitted from light-emitting element 112, and emits signal light Ls and monitor light Lm to the outside of first optical receptacle 230.

A first transmittance, which is a ratio of the intensity of emission light emitted from first optical receptacle 230 (in the present embodiment, signal light Ls and monitor light Lm) to the intensity of light incident on first optical receptacle 230 (in the present embodiment, first emission light L1), is smaller than a second transmittance, which is a ratio of the intensity of emission light (in the present embodiment, second emission light L2) emitted from second optical receptacle 140 to the intensity light incident on second optical receptacle 140 (in the present embodiment, second emission light L2). In the present embodiment, to set the first transmittance smaller than the second transmittance, first optical receptacle 230 includes light attenuation film 238 (described later) for attenuating the intensity of transmitting light.

First optical receptacle 230 is formed of a material that is transparent to light of a wavelength used in optical communications. Examples of such a material include transparent resins such as polyetherimide (PEI) and cyclic olefin resin. In the case where first optical receptacle 230 and second optical receptacle 140 are composed of a resin composition as described above, it is preferable that the base resins of first optical receptacle 230 and second optical receptacle 140 be identical to each other. With such a configuration, the linear expansion coefficients of first optical receptacle 230 and second optical receptacle 140 are set to an identical value, and reduction in shape precision can be suppressed even in the case where optical module 200 is used under a high temperature.

A light attenuator for attenuating the intensity of light (first emission light L1, monitor light Lm and signal light Ls) passing through the inside of first optical receptacle 230 may or may not be added in the material of first optical receptacle 230. Examples of the light attenuator include inorganic particles (such as carbon black and oxidation copper) and organic coloring matter (phthalocyanine coloring matter). The light attenuator is not added in the materials of first optical receptacle 230 and second optical receptacle 140 according to the present embodiment.

In the case where first optical receptacle 230 and second optical receptacle 140 are so small that it is difficult to assemble optical module 200, it is preferable to dispose optical receptacle 220 on substrate 111 after first optical receptacle 230 and second optical receptacle 140 are coupled with each other in view of increasing the ease of assembly of optical module 200.

Configuration of First Optical Receptacle

Figure 9A:
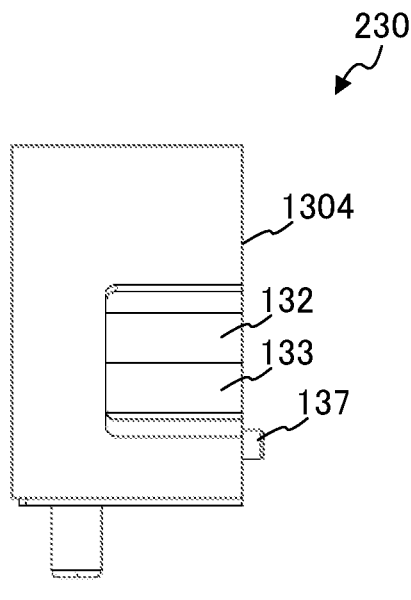
FIGS. 9A to 9F illustrate a configuration of a first optical receptacle according to Embodiment 2.
Figure 9B:
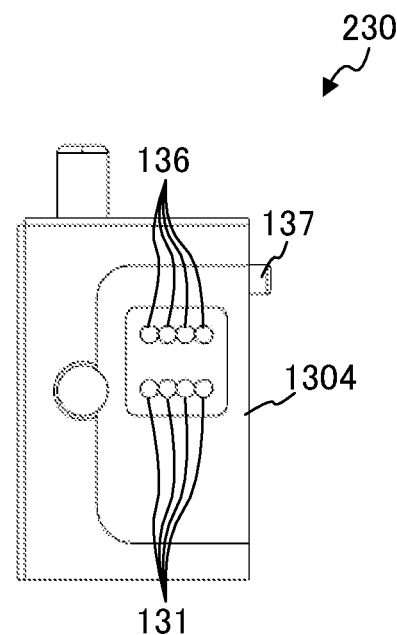
Figure 9C:
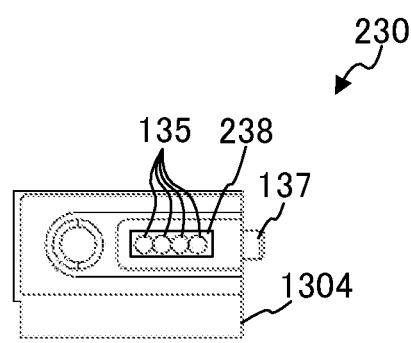
Figure 9D:
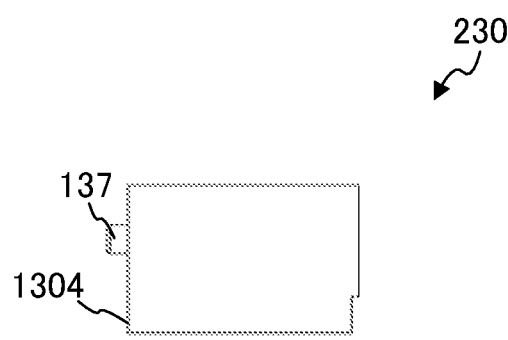
Figure 9E:
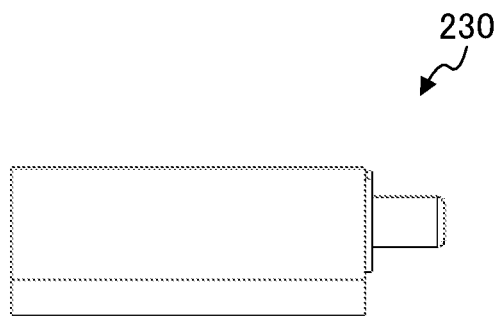
Figure 9F:
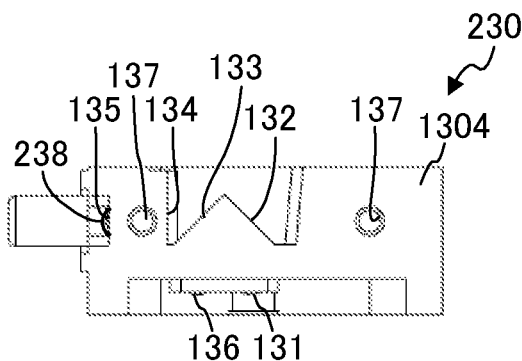

FIGS. 9A to 9F illustrate a configuration of first optical receptacle 230 according to the present embodiment. FIG. 9A is a plan view of first optical receptacle 230, FIG. 9B is a bottom view of first optical receptacle 230, FIG. 9C is a front view of first optical receptacle 230, FIG. 9D is a rear view of first optical receptacle 230, FIG. 9E is a left side view of first optical receptacle 230, and FIG. 9F is a right side view of first optical receptacle 230.

First optical receptacle 230 includes first optical surface 131, first reflection surface 132, light separation part 133, transmission surface 134, second optical surface 135, third optical surface 136, first fitting part 137 and light attenuation film 238.

Light attenuation film 238 attenuates the intensity of transmitting light (in the present embodiment, signal light Ls). Light attenuation film 238 is disposed on the light path of light entering first optical receptacle 230 (first emission light L1 entering from first optical surface 131 or signal light Ls entering from transmission surface 134) or light emitted from first optical receptacle 230 (signal light Ls emitted from light separation part 133 or monitor light Lm emitted from second optical surface 135) to attenuate the intensity of the light. Light attenuation film 238 may be disposed on the entire surface of first optical receptacle 230, or may be disposed only on the optical surface (first optical surface 131 or second optical surface 135). In the present embodiment, light attenuation film 238 is disposed only on second optical surface 135 to attenuate the intensity of signal light Ls. The way of disposing light attenuation film 238 on the surface of first optical receptacle 230 may be, but not limited to, applying a light attenuation coating to the surface of first optical receptacle 230, for example. Examples of the material of light attenuation film 238 include Cr, Ni alloy and TiO2.

Light Paths in Optical Module

Next, light paths in optical module 200 are described. In the present embodiment, the light paths in the portion that functions as the receiving optical module (second optical receptacle 140) are identical to the light paths in the portion that functions as the receiving optical module (second optical receptacle 140) in optical module 100 according to Embodiment 1, and therefore the description thereof will be omitted.

In first optical receptacle 230 that functions as the transmitting optical module, first emission light L1 emitted from light-emitting element 112 enters first optical receptacle 230 from first optical surface 131. At this time, first emission light L1 is converted to collimate light by first optical surface 131. Next, first emission light L1 having entered first optical receptacle 230 from first optical surface 131 is reflected by first reflection surface 132 toward light separation part 133. A part of first emission light L1 reaching light separation part 133 is internally reflected by divided reflection surface 133a toward third optical surface 136, and becomes monitor light Lm. Monitor light Lm is emitted out of first optical receptacle 230 from third optical surface 136, and reaches the detection surface of detection device 113. On the other hand, the remaining part of first emission light L1 reaching light separation part 133 passes through divided transmission surface 133b while being emitted out of first optical receptacle 230, and becomes signal light Ls. Next, signal light Ls reenters first optical receptacle 230 from transmission surface 134, and reaches second optical surface 135. Signal light Ls reaching second optical surface 135 is emitted out of first optical receptacle 130 from second optical surface 135, and reaches the end surface of optical transmission member 150 through light attenuation film 238. At this time, signal light Ls reaches the end surface of optical transmission member 150 while the intensity of signal light Ls is attenuated by light attenuation film 238.

In the above-mentioned manner, optical receptacle 220 according to the present embodiment can appropriately optically couple light-emitting element 112 and light-receiving element 114 to the end surfaces of respective optical transmission members 150 while attenuating the intensity of light passing through the portion that functions as the transmitting optical module.

Effect

As described above, optical receptacle 220 according to the present embodiment includes first optical receptacle 230 for transmission and second optical receptacle 140 for reception that are coupled with each other through a fitting structure (first fitting part 137 and second fitting part 144). First optical receptacle 230 and second optical receptacle 140 may be manufactured as separated members. In the present embodiment, first optical receptacle 230 includes light attenuation film 238, and second optical receptacle 140 does not include a light attenuation film. With this configuration, it is possible to appropriately attenuate only the intensity of light passing through the portion that functions as the transmitting optical module with almost no attenuation of the intensity of light passing through the portion that functions as the receiving optical module.

In addition, by using unified fitting structures (first fitting part 137 and second fitting part 144), it is possible to readily change the combination of first optical receptacle 230 and second optical receptacle 140 that are different in optical design.

Optical receptacle 220 according to the present embodiment includes a plurality of members, first optical receptacle 230 for transmission and second optical receptacle 140 for reception, and as such the number of components of optical receptacle 120 is larger than that of a conventional optical receptacle composed of a single member. However, in optical receptacle 220, an attenuation coating can be applied only to the optical surface of the portion that functions as the transmitting optical module by separately manufacturing first optical receptacle 230 and second optical receptacle 140. Since there is no risk of mistakenly applying an attenuation coating to the optical surface of the portion that functions as the receiving optical module, the positional accuracy of the mask used in the attenuation coating may not be high.

It is to be noted that the optical receptacle according to the embodiments of the present invention is not limited to optical receptacles 120 and 220 described in Embodiments 1 and 2 in which the shapes of first optical receptacles 130 and 230, and second optical receptacle 140 are different. For example, the optical receptacle may include a first optical receptacle and a second optical receptacle having the same shape. With this configuration, the first optical receptacle and the second optical receptacle can be manufactured with the same metal mold, and the cost of the metal mold can be reduced. In this case, first optical receptacles 130 and 230 further include one or more third fitting parts disposed in a third side surface that is opposite to first side surface 1304 with respect to the light path of first emission light L1, and second optical receptacle 140 further includes one or more fourth fitting parts having a shape capable of fitting with the third fitting part and disposed in a fourth side surface that is opposite to second side surface 1403 with respect to the light path of second emission light L2.

In addition, the optical receptacle according to the embodiments of the present invention is not limited to optical receptacles 120 and 220 described in Embodiments 1 and 2 including first optical receptacles 130 and 230 including first reflection surface 132, light separation part 133, transmission surface 134 and third transmission surface 136, and second optical receptacle 140 including second reflection surface 142. For example, first optical receptacles 130 and 230 may not include first reflection surface 132, light separation part 133, transmission surface 134 or third transmission surface 136, and second optical receptacle 140 may not include a second reflection surface.

In this case, first optical surface 131 and second optical surface 135 are disposed on the opposite sides in first optical receptacles 130 and 230, and fourth optical surface 141 and fifth optical surface 143 are disposed on the opposite sides in second optical receptacle 140. In addition, the first transmittance is the ratio of the intensity of emission light (first emission light L1) emitted from first optical receptacles 130 and 230 to the intensity of the incident light (first emission light L1) incident on first optical receptacles 130 and 230. Then, in first optical receptacles 130 and 230 that function as the transmitting optical module, first emission light L1 which has been emitted from light-emitting element 112 and has entered first optical receptacles 130 and 230 from first optical surface 131 is emitted out of first optical receptacles 130 and 230 from second optical surface 135 without being incident on reflection surface 132, light separation part 133 or light transmission surface 134, and reaches the end surface of optical transmission member 150. First emission light L1 is also signal light that is emitted to other optical modules. On the other hand, in second optical receptacle 140 that functions as the receiving optical module, second emission light L2 which has been emitted from the end surface of optical transmission member 150 and has entered second optical receptacle 140 from fourth optical surface 141 is emitted out of second optical receptacle 140 from fifth optical surface 143 without being reflected by reflection surface 142, and reaches light reception surface of light-receiving element 114. In the case where first optical receptacles 130 and 230 do not include light separation part 133, photoelectric conversion device 110 does not include detection device 113.

Further, a reflection film composed of a thin film of a metal having a high light reflectance (such as Al, Ag and Au) may be formed on first reflection surface 132, divided reflection surface 133a and second reflection surface 142. In the case where reduction of the number of components is desired to be prioritized, it is preferable to employ a configuration in which only a total reflection surface is utilized.

This application is entitled to and claims the benefit of Japanese Patent Application No. 2016-043299 filed on Mar. 7, 2016, the disclosure each of which including the specification, drawings and abstract is incorporated herein by reference in its entirety.

INDUSTRIAL APPLICABILITY

The optical receptacle and the optical module according to the embodiment of the present invention are suitable for optical communications using an optical transmission member, for example.

REFERENCE SIGNS LIST

1 Optical receptacle
2 Optical receptacle main body
3 Optical filter
4 Lens surface
5 Optical surface
100, 200 Optical module
110 Photoelectric conversion device
111 Substrate
112 Light-emitting element
113 Detection device
114 Light-receiving element
120, 220 Optical receptacle
130, 230 First optical receptacle
1301 First recess
1302 Second recess
1303 Third recess
1304 First side surface 131 First optical surface
132 First reflection surface
133 Light separation part
133a Divided reflection surface
133b Divided transmission surface
133c Divided step surface
134 Transmission surface
135 Second optical surface
136 Third optical surface
137 First fitting part
140 Second optical receptacle
1401 Fourth recess
1402 Fifth recess
1403 Second side surface
141 Fourth optical surface
142 Second reflection surface
143 Fifth optical surface
144 Second fitting part
150 Optical transmission member
238 Light attenuation film
L1 First emission light
L2 Second emission light
Ls Signal light
Lm Monitor light

The invention claimed is:

1. An optical receptacle configured to be disposed between a photoelectric conversion device including a light-emitting element and a light-receiving element which are disposed on a substrate, and a plurality of optical transmission members, the optical receptacle being configured to optically couple the light-emitting element and the light-receiving element to respective end surfaces of the plurality of optical transmission members, the optical receptacle comprising:
a first optical receptacle for transmission disposed on the substrate in such a manner that the first optical receptacle is opposite to the light-emitting element, the first optical receptacle including a first fitting part disposed in a first side surface that is not a surface opposite to the substrate; and
a second optical receptacle for reception disposed on the substrate in such a manner that the second optical receptacle is opposite to the light-receiving element, the second optical receptacle including a second fitting part disposed in a second side surface that is not a surface opposite to the substrate, the second fitting part being configured to be fitted with the first fitting part,
wherein the first optical receptacle does not include a fitting part disposed in a third side surface that is opposite to the first side surface, and the second optical receptacle does not include a fitting part disposed in a fourth side surface that is opposite to the second side surface,
wherein a ratio of an intensity of emission light emitted from the first optical receptacle to an intensity of incident light incident on the first optical receptacle is smaller than a ratio of an intensity of emission light emitted from the second optical receptacle to an intensity of incident light incident on the second optical receptacle,
wherein the first optical receptacle and the second optical receptacle are configured to be coupled with each other by fitting the first fitting part and the second fitting part to each other.

2. The optical receptacle according to claim 1, wherein the first optical receptacle is formed of a material containing a light attenuator for attenuating an intensity of light passing through an inside of the first optical receptacle.

3. The optical receptacle according to claim 1, wherein the first optical receptacle further includes a light attenuation film disposed in at least a part of a surface of the first optical receptacle, the light attenuation film being configured to attenuate an intensity of light incident on the first optical receptacle or an intensity of light emitted from the first optical receptacle.

4. The optical receptacle according to claim 1,
wherein the first optical receptacle and the second optical receptacle are formed of a resin composition; and
wherein base resins of the first optical receptacle and the second optical receptacle are identical to each other.

5. The optical receptacle according to claim 1,
wherein the first optical receptacle further includes:
a first optical surface configured to allow incidence of first emission light emitted from the light-emitting element, and
a second optical surface configured to emit, toward the end surfaces of the plurality of optical transmission members, the first emission light which has entered the first optical receptacle from the first optical surface and has passed through an inside of the first optical receptacle; and
wherein the second optical receptacle further includes:
a third optical surface configured to allow incidence of second emission light emitted from the end surfaces of the plurality of optical transmission members, and
a fourth optical surface configured to emit, toward the light-receiving element, the second emission light which has entered the second optical receptacle from the third optical surface and has passed through an inside of the second optical receptacle.

6. An optical module comprising:
a photoelectric conversion device including a substrate, a light-emitting element and a light-receiving element, the light-emitting element and the light-receiving element being disposed on the substrate; and
the optical receptacle according to claim 1,
wherein the first optical receptacle is disposed on the substrate in such a manner that the first optical receptacle is opposite to the light-emitting element,
wherein the second optical receptacle is disposed on the substrate in such a manner that the second optical receptacle is opposite to the light-receiving element, and
wherein the first optical receptacle and the second optical receptacle are coupled with each other by fitting the first fitting part and the second fitting part to each other.

* * * * *